US012709920B2

(12) United States Patent
Tse et al.

(10) Patent No.: US 12,709,920 B2
(45) Date of Patent: Aug. 18, 2026

(54) SECURITY APPARATUS HAVING A REMOVABLE PLUNGER

(71) Applicant: ACCO Brands Corporation, Lake Zurich, IL (US)

(72) Inventors: Wilson S. Tse, Burnaby (CA); James Kao, Fremont, CA (US); Michael D. Otsuka, Sunnyvale, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 37 days.

(21) Appl. No.: 18/824,368

(22) Filed: Sep. 4, 2024

(65) Prior Publication Data

US 2025/0075535 A1 Mar. 6, 2025

Related U.S. Application Data

(60) Provisional application No. 63/580,674, filed on Sep. 5, 2023.

(51) Int. Cl.
*E05B 73/00* (2006.01)

(52) U.S. Cl.
CPC ................................ *E05B 73/0082* (2013.01)

(58) Field of Classification Search
CPC .................................................. E05B 73/0082
USPC ............................................................. 70/58
See application file for complete search history.

(56) References Cited

U.S. PATENT DOCUMENTS 4,870,840 A * 10/1989 Klein .................. H01R 13/629 70/DIG. 72
4,893,488 A * 1/1990 Klein .................... H04M 1/667 70/57
5,687,592 A * 11/1997 Penniman ........... E05B 73/0005 361/679.55

(Continued)

FOREIGN PATENT DOCUMENTS

AU 3394093 A 9/1993
CN 2762203 Y 3/2006

(Continued)

OTHER PUBLICATIONS

Taiwanese Patent Office Action and Search Report for Application No. 11321338170 dated Dec. 31, 2024 (30 pages including English machine translation).

*Primary Examiner* — Nathan Cumar
(74) *Attorney, Agent, or Firm* — Michael, Best & Friedrich LLP

(57) ABSTRACT

A security apparatus for a portable electronic device includes a lock body, an engagement member supported by the lock body, and a lock tip configured to selectively engage the portable electronic device. The lock tip is movable by the engagement member between an engaged position, in which the lock tip is secured to the portable electronic device, and an disengaged position, in which the lock tip is unsecured from the portable electronic device. The lock tip includes a first finger and a second finger that engage the portable electronic device in the engaged position, and a plunger that extends between the first and second fingers and is movable by the engagement member. The plunger includes an engagement feature configured to removably engage the engagement member such that the plunger is selectively removable by a user.

20 Claims, 11 Drawing Sheets

(56) References Cited

U.S. PATENT DOCUMENTS

| | | | | | |
|---|---|---|---|---|---|
| 5,717,571 | A * | 2/1998 | Helot | G06F 1/1656 | 439/372 |
| 6,449,992 | B1 * | 9/2002 | Yu | E05B 73/0082 | 70/426 |
| 6,708,535 | B1 * | 3/2004 | Sanders | E05B 73/0005 | 70/58 |
| 6,763,688 | B1 * | 7/2004 | Syu | E05B 73/0082 | 248/553 |
| 6,779,370 | B2 * | 8/2004 | Bellow, Jr. | E05B 73/0082 | 403/348 |
| 7,302,816 | B1 * | 12/2007 | Lu | E05B 73/0082 | 70/49 |
| 7,308,809 | B2 * | 12/2007 | Lu | G06F 1/182 | 70/57 |
| 7,315,443 | B2 * | 1/2008 | Allen | E05B 73/0082 | 361/679.55 |
| 7,441,426 | B2 * | 10/2008 | Avganim | E05B 73/0082 | 70/30 |
| 7,549,308 | B2 * | 6/2009 | Avganim | E05B 73/0082 | 70/58 |
| 7,997,106 | B2 * | 8/2011 | Mahaffey | E05B 73/00 | 70/49 |
| 8,001,812 | B2 * | 8/2011 | Mahaffey | E05B 73/0082 | 70/34 |
| 8,042,366 | B2 * | 10/2011 | Mahaffey | E05B 73/00 | 403/360 |
| 8,336,344 | B2 * | 12/2012 | Senatori | G06F 21/86 | 24/458 |
| 8,701,452 | B2 * | 4/2014 | Foster | E05B 73/0082 | 248/316.4 |
| 8,844,329 | B2 * | 9/2014 | Anderson | E05B 73/0005 | 70/DIG. 9 |
| 8,991,225 | B2 * | 3/2015 | Wu | E05B 73/0082 | 70/58 |
| 9,122,449 | B2 * | 9/2015 | DeSilva | H02G 3/081 | |
| 9,141,145 | B2 * | 9/2015 | White | H05K 5/0221 | |
| 9,574,378 | B2 * | 2/2017 | Wu | E05B 73/0082 | |
| 10,067,533 | B1 * | 9/2018 | Powell | G06F 1/1679 | |
| 10,400,482 | B2 * | 9/2019 | Kao | E05B 73/0082 | |
| 10,718,138 | B2 * | 7/2020 | Wu | E05B 73/0082 | |
| 10,808,431 | B2 * | 10/2020 | Su | E05B 73/0082 | |
| 11,187,014 | B2 * | 11/2021 | Kao | E05B 73/0082 | |
| 11,203,885 | B2 * | 12/2021 | Su | E05B 73/0005 | |
| 11,203,886 | B2 * | 12/2021 | Wu | E05B 73/0082 | |
| 11,680,429 | B2 * | 6/2023 | Kao | E05B 73/0005 | 361/679.55 |
| 11,686,129 | B2 * | 6/2023 | Kao | E05B 73/0082 | 361/679.55 |
| 2003/0101778 | A1 * | 6/2003 | Carl | E05B 73/0005 | 70/58 |
| 2006/0232926 | A1 * | 10/2006 | Homer | E05B 73/0082 | 361/679.43 |
| 2008/0110217 | A1 * | 5/2008 | Andrews | E05B 73/0082 | 70/58 |
| 2012/0312056 | A1 * | 12/2012 | Yu | E05B 73/0082 | 70/14 |
| 2014/0069153 | A1 * | 3/2014 | Wu | E05B 73/0082 | 70/58 |
| 2014/0174137 | A1 * | 6/2014 | Xue | E05B 73/0005 | 70/14 |
| 2014/0298868 | A1 * | 10/2014 | Richards | E05B 73/0082 | 70/15 |
| 2016/0081212 | A1 * | 3/2016 | Avganim | E05B 39/00 | 70/57.1 |
| 2017/0247916 | A1 * | 8/2017 | Kao | G06F 1/1656 | |
| 2018/0252003 | A1 * | 9/2018 | Klinkman | G06F 1/1632 | |
| 2018/0283055 | A1 * | 10/2018 | Chen | E05B 15/14 | |
| 2018/0347237 | A1 * | 12/2018 | Tse | E05B 73/0082 | |
| 2018/0363334 | A1 * | 12/2018 | Wu | E05B 73/0005 | |
| 2019/0112840 | A1 * | 4/2019 | Wu | E05B 73/0005 | |
| 2020/0080346 | A1 * | 3/2020 | Wu | E05B 73/0082 | |
| 2021/0025200 | A1 * | 1/2021 | Wu | E05B 73/0082 | |
| 2022/0065002 | A1 * | 3/2022 | Wu | E05B 73/0082 | |
| 2022/0162886 | A1 * | 5/2022 | De Meulenaere | E05B 63/0056 | |
| 2023/0160236 | A1 * | 5/2023 | Klinkman | E05B 73/0082 | 70/58 |
| 2023/0243191 | A1 * | 8/2023 | Wang | E05B 63/0056 | 70/58 |

FOREIGN PATENT DOCUMENTS

| | | | |
|---|---|---|---|
| CN | 101200988 | A | 6/2008 |
| CN | 103792992 | A | 5/2014 |
| CN | 211201482 | U | 8/2020 |
| CN | 112096196 | A | 12/2020 |
| CN | 114525977 | A | 5/2022 |
| DE | 202019104984 | U1 | 1/2020 |
| DE | 202020103694 | U1 | 7/2020 |
| EP | 4209646 | A1 | 7/2023 |
| TW | 201229373 | A | 7/2012 |
| TW | M447911 | U | 3/2013 |
| TW | M553352 | U | 12/2017 |
| TW | M587677 | U | 12/2019 |
| TW | M593451 | U | 4/2020 |
| WO | 2003052222 | A1 | 6/2003 |
| WO | 2017058217 | A1 | 4/2017 |
| WO | 2017147065 | A1 | 8/2017 |

* cited by examiner

SECURITY APPARATUS HAVING A REMOVABLE PLUNGER

CROSS-REFERENCE TO RELATED APPLICATIONS

This application claims priority to U.S. Provisional Patent Application No. 63/580,674 filed on Sep. 5, 2023, the entire contents of which incorporated herein by reference.

BACKGROUND

The present invention relates to security apparatuses for securing portable electronic devices and, more particularly, to security apparatuses for use with different interfaces on portable electronic devices.

Security apparatuses are commonly used to secure laptop computers, tablet computers, and other portable electronic devices in place. Some security apparatuses are configured to engage and lock in slots formed in the portable electronic devices. Different portable electronic devices may have different shapes and/or sizes of slots.

SUMMARY

In one embodiment, the invention provides a security apparatus for a portable electronic device. The security apparatus includes a lock body, and an engagement member supported by the lock body. The security apparatus further includes a lock tip configured to selectively engage the portable electronic device. The lock tip is movable by the engagement member between an engaged position, in which the lock tip is secured to the portable electronic device, and a disengaged position, in which the lock tip is unsecured from the portable electronic device. The lock tip includes a first finger and a second finger that engage the portable electronic device in the engaged position, and a plunger that extends between the first and second fingers and is movable by the engagement member. The plunger includes an engagement feature configured to removably engage the engagement member such that the plunger is selectively removable by a user.

In another embodiment, the invention provides a security apparatus configured to interchangeably engage a slot of a first portable electronic device and a slot of a second portable electronic device. The security apparatus includes a lock body, and an engagement member supported by the lock body. The security apparatus further includes a lock tip configured to selectively engage the portable electronic device. The lock tip is movable by the engagement member between an engaged position, in which the lock tip is secured to the portable electronic device, and a disengaged position, in which the lock tip is unsecured from the portable electronic device. The lock tip includes a first finger and a second finger that engage the portable electronic device in the engaged position. The lock tip further includes an interchangeable first plunger and second plunger, wherein the first plunger is configured to create a gap of a first width when installed between the first and second fingers and in the engaged position and wherein the second plunger creates a gap of a second width when installed between the first and second fingers and in the engaged position, wherein the second width is less than the first width.

In another embodiment, the invention provides a method of modifying a security apparatus. The method includes axially removing a first plunger from between a first finger and a second finger of the security apparatus. A second plunger dissimilar from the first plunger is axially inserted between the first and second fingers. In some embodiments, axially removing the first plunger includes disengaging an engagement feature of the first plunger from an engagement member. In some embodiments, axially inserting the second plunger between the first and second plungers includes engaging an engagement feature of the second plunger with the engagement member.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
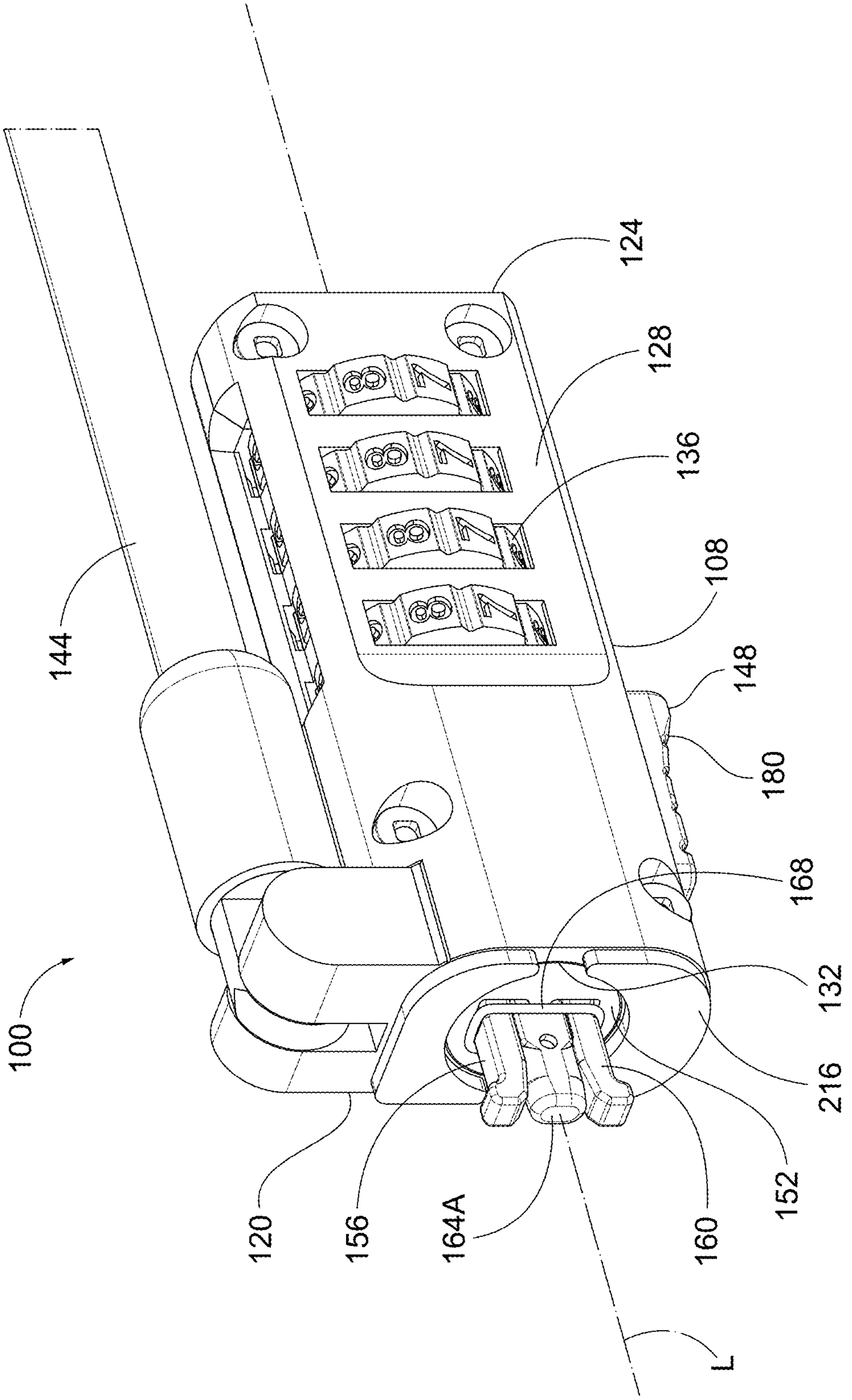
FIG. 1 is a perspective view of a security apparatus having a combination lock mechanism and a first removable plunger.
Figure 5:
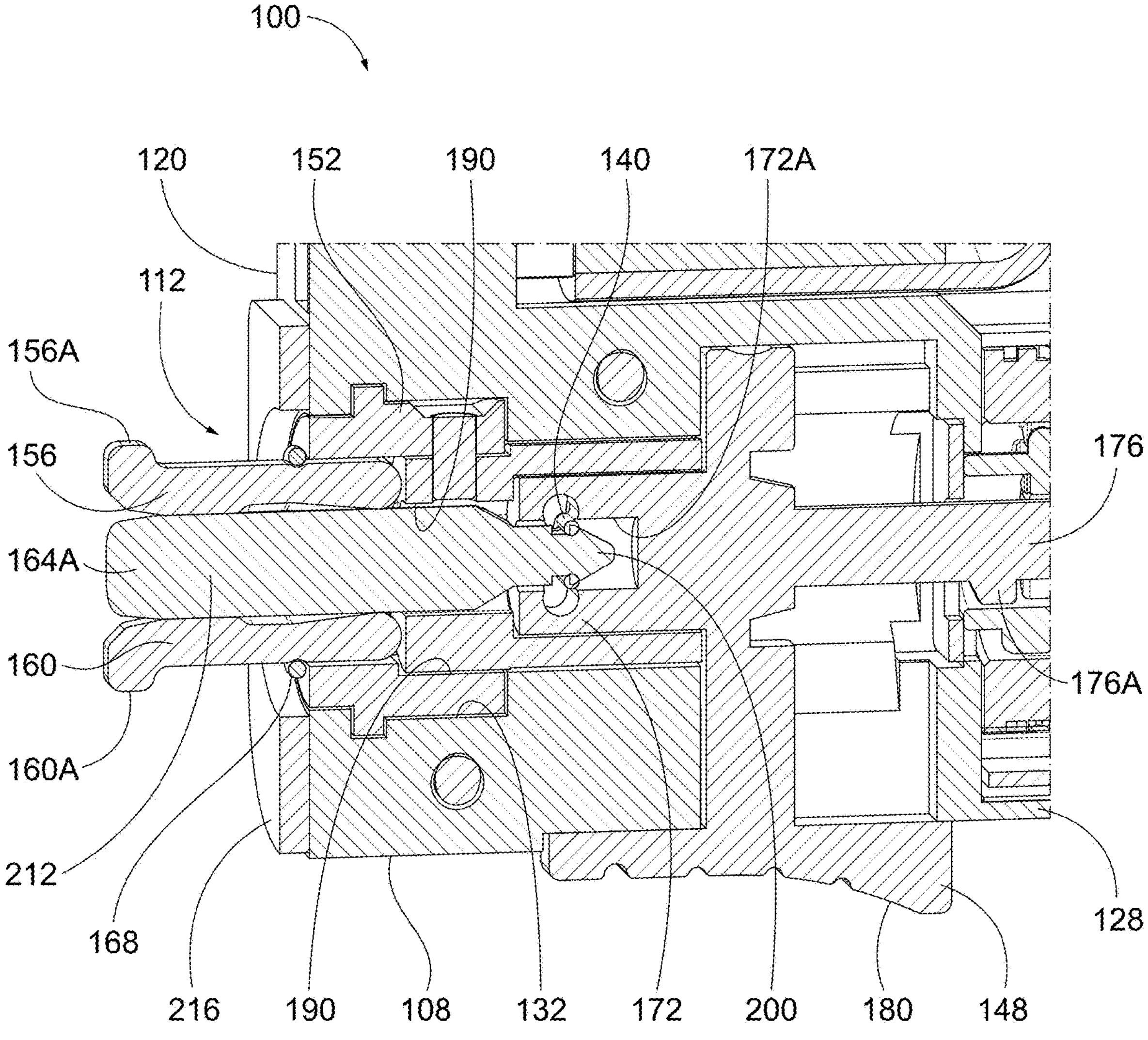
FIG. 5 is a partial cross-section of the first removable plunger coupled to an engagement feature of the security apparatus of FIG. 1.

FIGS. 1 and 5 illustrate a security apparatus 100 embodying the invention. The security apparatus 100 is configured to engage a portable electronic device (e.g., a tablet computer, a laptop computer, a smartphone, an mp3 player, an eReader, etc.) to secure the portable electronic device at a location. The illustrated security apparatus 100 includes a lock body 108, a lock tip 112, and an engagement member 148.

The illustrated lock body 108 is generally cylindrical (e.g., a rectangular prism having rounded edges) in shape, extending between a first end 120 and a second end 124, and houses a lock mechanism 128 in the form of a combination lock. In some embodiments, the lock body 108 includes a recess 132 within which the lock tip 112 is rotatable. In other embodiments, the lock body may be integrally formed, and therefore not rotatable relative to, the lock body 108. The lock body 108 may have other shapes or configurations.

The security apparatus 100 also includes a cable 144. A first end of the cable 144 is coupled to the lock body 108 and rotatable relative to the lock body 108. In the illustrated embodiment, the first end of the cable 144 is coupled to the lock body 108 adjacent the lock tip 112 at the first end 120 of the lock body 108. At a second end (not shown), the cable 144 may be coupled to a relatively stationary object such that when the lock tip 112 is coupled to the lock body 108 and to the portable electronic device, the portable electronic device is coupled to the relatively stationary object via the security apparatus 100. The relatively stationary object may be a desk, a chair, a bracket, and the like.

The illustrated lock tip 112 includes a body 152, first and second expandable fingers 156, 160 (shown in greater detail in FIG. 11), and a separate, removable plunger 164A. The body 152 (shown in greater detail in FIGS. 12-13) is cylindrical and is receivable within the recess 132 of the lock body 108. The fingers 156, 160 are coupled to and extend outwardly from the body 152. When assembled, as shown in FIG. 1, the fingers 156, 160 and the plunger 164A extend axially from the body 152 and are generally aligned with the longitudinal axis L. The two fingers 156, 160 are positioned adjacent to and radially outward from the plunger 164A. The fingers 156, 160, or tabs or latches, are movable relative to the body 152 between an unlocked position and a locked position by actuation of the plunger 164A, as described in greater detail below. An elastomeric element 168 (e.g., an O-ring or rubber band) may surround the fingers 156, 160 to help bias the fingers 156, 160 toward the plunger 164A and toward the unlocked position. An elastomeric shroud 216 may surround the elastomeric element 168 and a portion of the fingers 156, 160 and acts as a buffer between the lock body 108 of the security apparatus 100 and the portable electronic device.

When in the unlocked position, the fingers 156, 160 are positioned radially inward so that the fingers 156, 160 are spaced apart from and disengage the portable electronic device. In this position, the lock tip 112 can be inserted into and removed from a slot in the device 104. When in the locked position, the fingers 156, 160 are moved (e.g., pivoted) away from each other and radially outward relative to the body 152. In this position, the fingers 156, 160 engage the portable electronic device to secure the lock tip 112 to the device 104.

Figure 11:
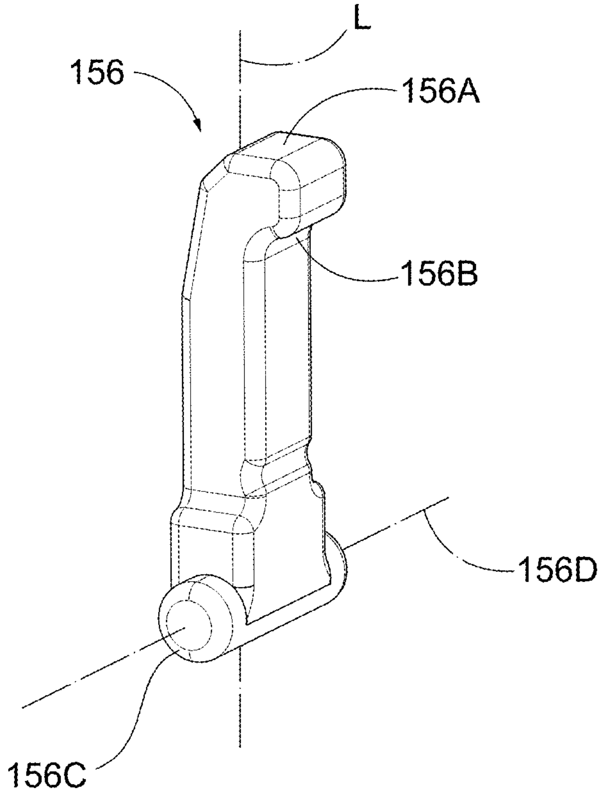
FIG. 11 is a perspective view of a finger of the security apparatus of FIG. 1.
Figure 12:
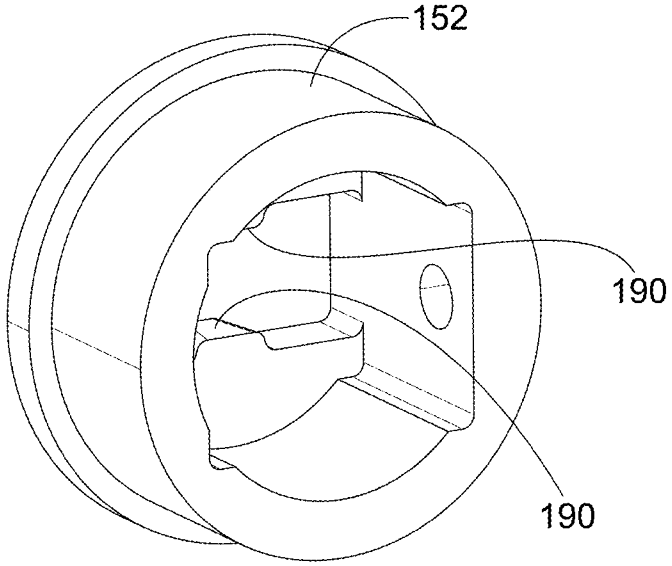
FIG. 12 is a first perspective view of a rotatable lock tip housing of the security apparatus of FIG. 1.

The first finger 156 is shown in greater detail in FIG. 11. The finger 156 is generally linear and extends generally parallel to the longitudinal axis when installed in the lock body 108. The finger includes a tip 156A at a first distal end that extends outward to define an engagement surface 156B for engaging an edge of a slot of the portable electronic device. A post 156C defines a rotational axis 156D of the finger 156 at a second distal end opposite the first distal end. The second finger 160 is identical to the first finger 156, though rotated 180 degrees prior to installation such that the tips 156A, 160A of the fingers face away from one another when installed in the lock body 108.

Figure 6:
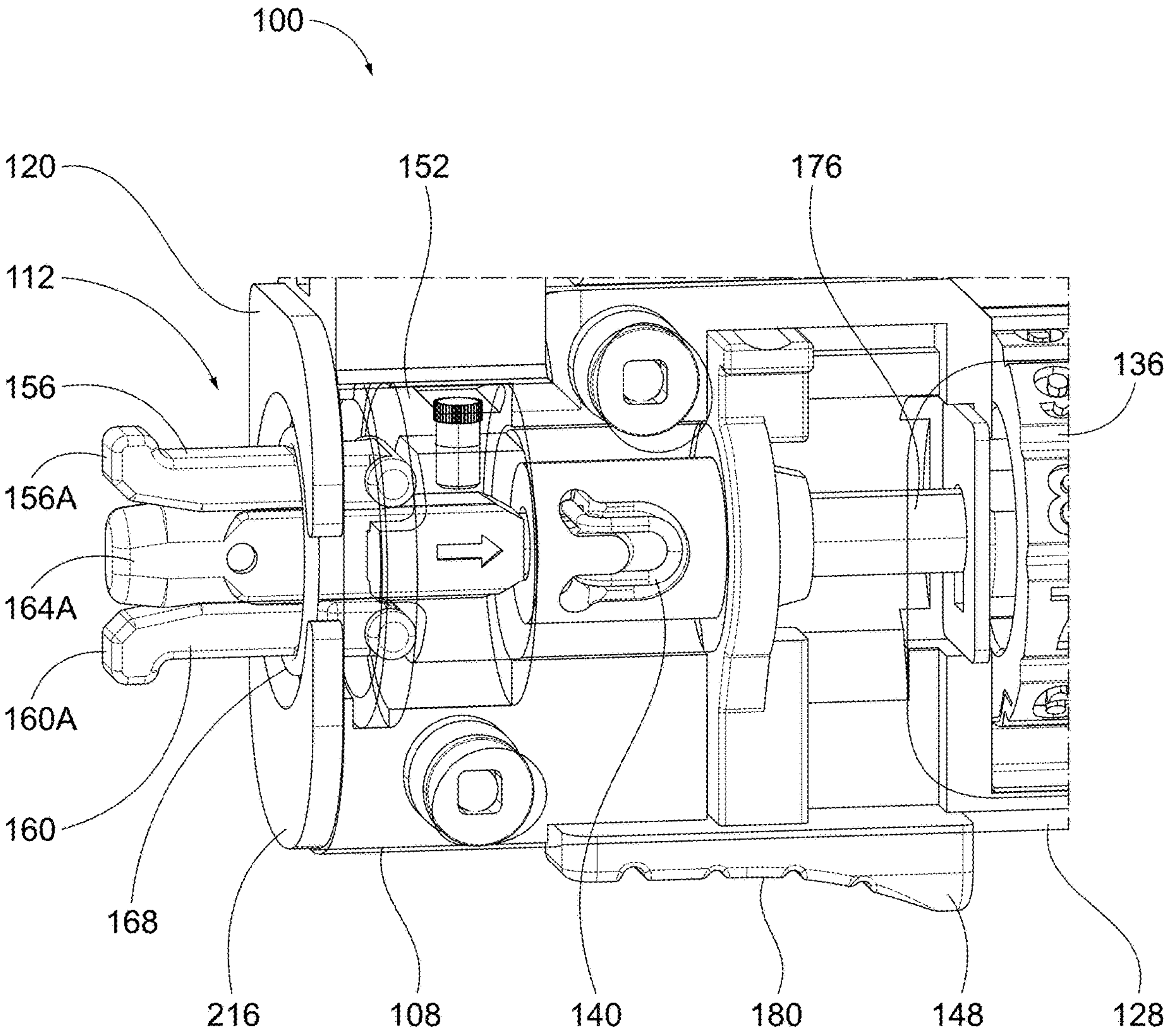
FIG. 6 is a view of a portion of the security apparatus illustrating the engagement feature.

The lock mechanism 128 illustrated in FIG. 1 is a combination lock formed of a plurality of rotatable dials 136, each housed within the lock body 108 and rotatable to different distinct rotational positions associated with different values. The dials 136 are offset from one another along the length of the lock body 108 and collectively allow a user to unlock the lock body 108 by entering the correct values (i.e., an unlocked position) into the security apparatus 100. In a similar fashion, by rotating the dials 136 to incorrect values (i.e., a locked position), a user locks the security apparatus 100. When the security apparatus 100 is engaged with a portable electronic device with the lock mechanism 128 in a locked position, an engagement member 148 (as shown in greater detail in FIGS. 5, 6, and 10) is precluded from movement and is therefore incapable of separating the security apparatus from the portable electronic device. When the lock mechanism 128 is in the unlocked position, the engagement member 148 is capable of moving the fingers 156, 160 between the engaged position and the disengaged position.

Figure 2:
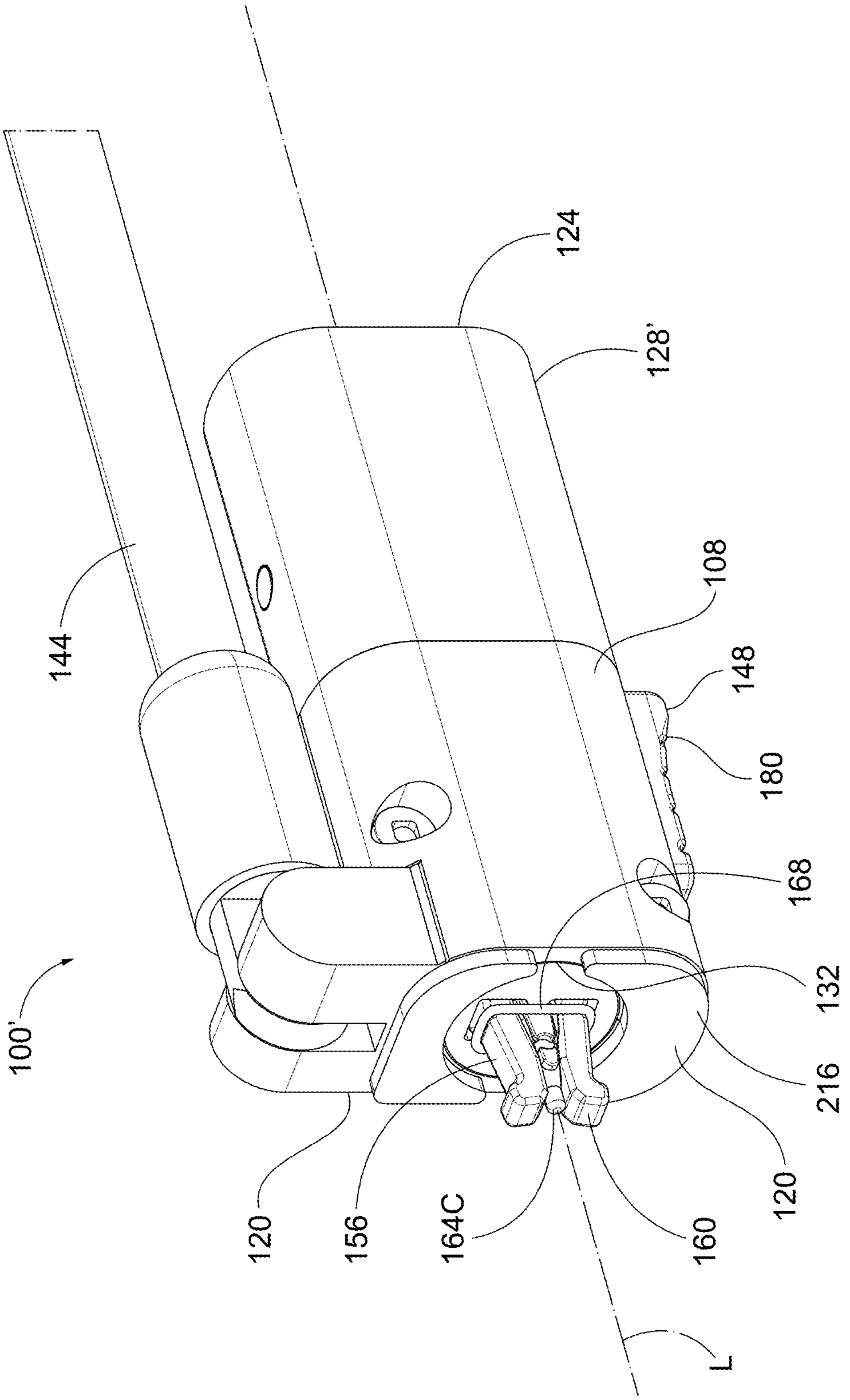
FIG. 2 is a perspective view of a security apparatus having a keyed lock mechanism and a second removable plunger, different than the first removable plunger.

In contrast to the combination lock mechanism 128 illustrated in FIG. 1, FIG. 2 illustrates a keyed lock mechanism 128'. The lock mechanism 128' includes a lock cylinder 130 having an opening 130 for receiving a key 136 as shown in greater detail in FIG. 8.

In some embodiments, the engagement member 148 is configured to move the fingers 156, 160 from the disengaged position to the engaged position regardless of the position of the dials 136 of the lock mechanism 128. In some embodiments, entering the correct value into the lock mechanism 128 allows a user to actuate an interface (e.g., a button), thereby moving the engagement member 148 and fingers 156, 160 from the engaged position to the disengaged position. In other embodiments, entering the correct value into the lock mechanism 128 allows a user to directly move the engagement member 148 manually.

Figure 10:
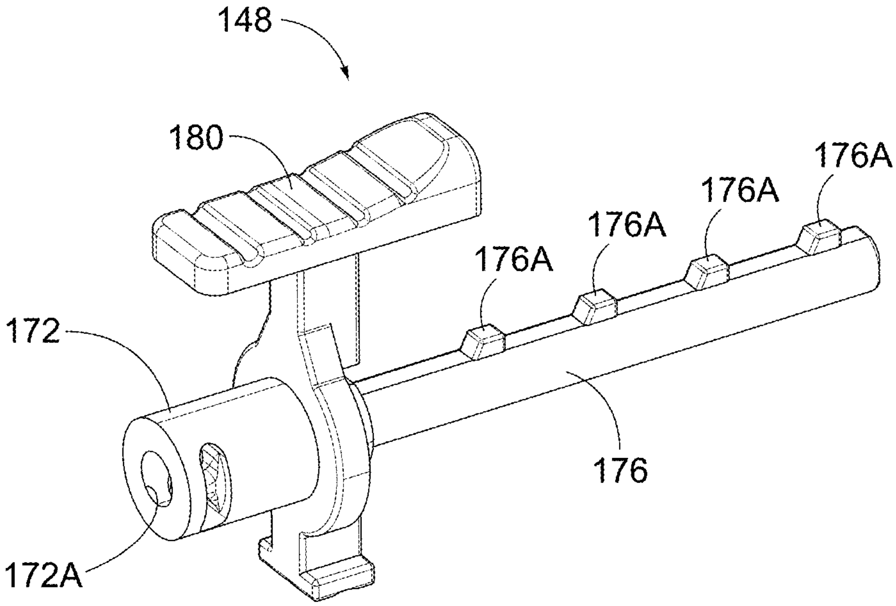
FIG. 10 is a perspective view of the engagement feature of the security apparatus of FIG. 1.

The engagement member 148 is illustrated in FIG. 10 and includes a plunger engaging portion 172, a lock mechanism engaging portion 176, and a user engaging portion 180. As shown, the plunger engaging portion 172 includes an opening or recess 172A for receiving a distal end of the plunger 164A. At an opposite end of the engagement member 148, the lock mechanism engaging portion 176 is generally cylindrical, having deviations 176A (e.g., extrusions, cutouts) that, when the combination lock 128 is in an unlocked position, are aligned with mating deviations in the dials 136 to allow translation of the engagement member 148 relative to the dials 136. The plunger engaging portion 172 and lock mechanism engaging portion 176 are generally coaxial with one another and, in some embodiments, are formed together as a single component. The user engaging portion 180 is coupled to (e.g., fastened to via an adhesive, weld, or fastener, or integrally formed with) the plunger engaging portion 172 and lock mechanism engaging portion 176 and is configured to be engaged (e.g., directly engaged) by a user (e.g., a finger of a user) to move the engagement member 148 relative to the lock body 108. By translating the engagement member 148 rearward (i.e., towards the lock mechanism 128) along the longitudinal axis L, the plunger 164A is moved rearward away from the tips of the fingers 156, 160 such that the fingers 156, 160 move inward to the disengaged position. By translating the engagement member 148 forward (i.e., towards the fingers 156, 160) along the longitudinal axis L, the plunger 164A is moved forward towards (and between/through) the tips of the fingers 156, 160 such that the fingers 156, 160 move outward to the engaged position.

Figure 8:
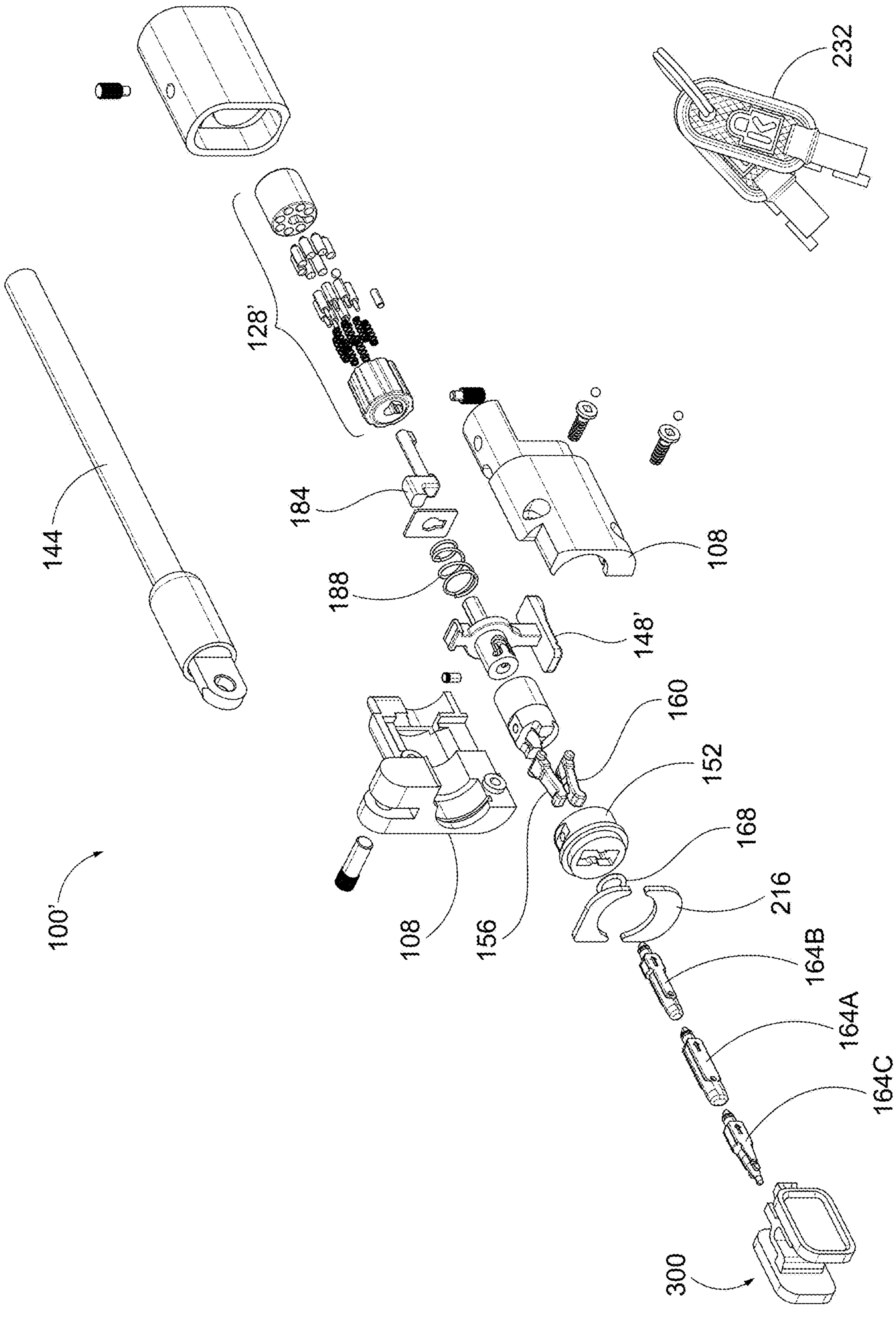
FIG. 8 is an exploded view of the security apparatus of FIG. 2.
Figure 9:
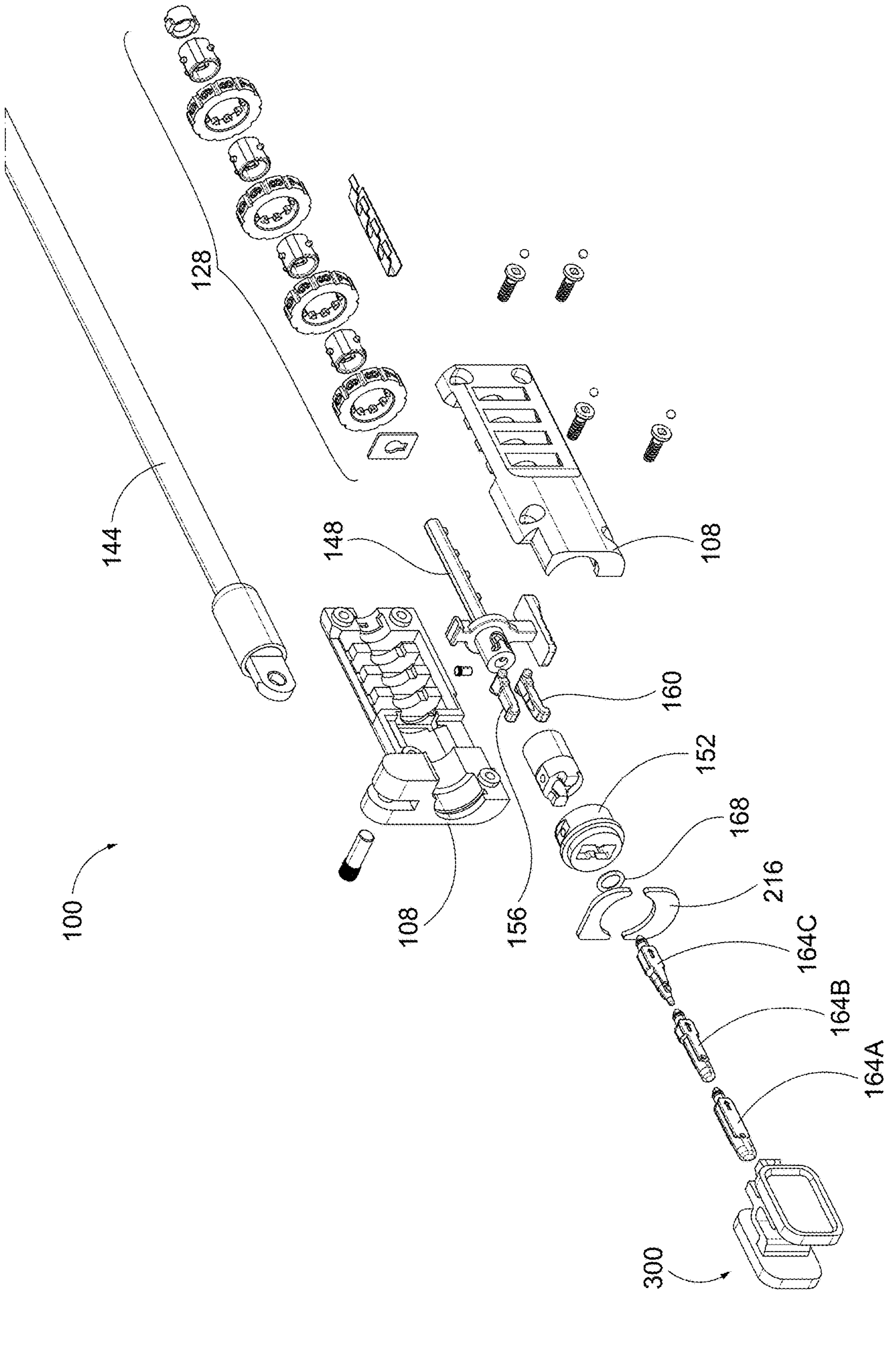
FIG. 9 is an exploded view of the security apparatus of FIG. 1.

The engagement member 148' associated with a keyed security apparatus 100', as shown in FIGS. 2 and 8 differs from the one described above based on the different input from the lock mechanism 128' to the engagement member 148'. Rather than having protrusions that engage dials of an engagement member 148, the engagement member 148' includes a protrusion 172A' that selectively engages a lock shaft 184 to allow or prevent axial movement of the engagement member 148'. Additionally, a spring 188 biases the engagement member 148' forward into the engaged position.

Different portable electronic devices have security slots of different widths to be engaged by different security apparatuses. The plunger 164A of the security apparatus 100 is a first plunger and is removable by a user (i.e., without fully disassembling or destroying the security apparatus) and replaceable by a second plunger 164B or a third plunger 164C. Each of the plungers 164A, 164B, 164C has a different width to facilitate engaging the security apparatus 100 with different slots of different widths.

Figure 3A:
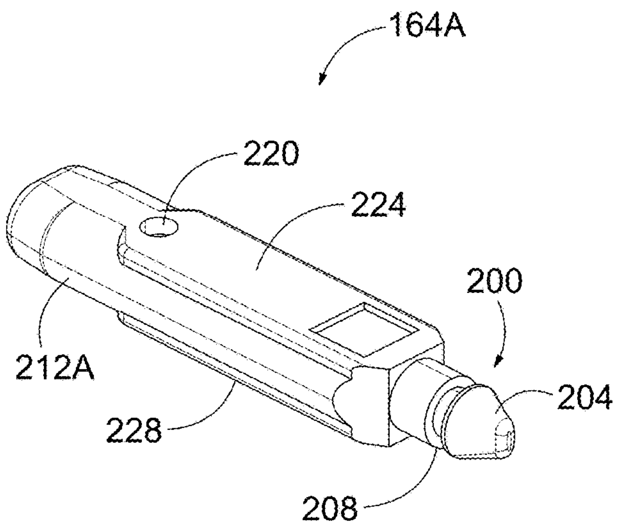
FIG. 3A is a first perspective view of the second removable plunger.
Figure 3B:
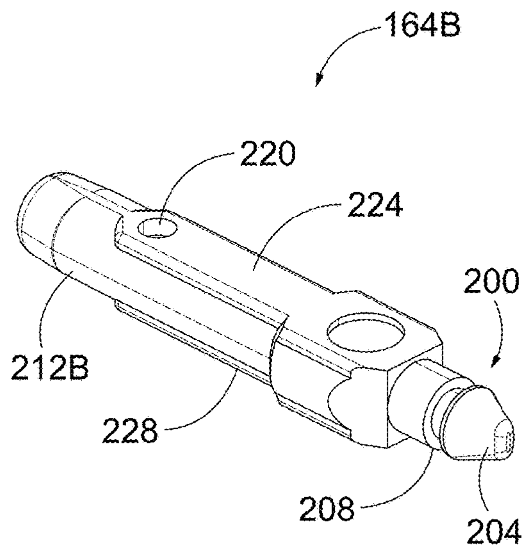
FIG. 3B is a first perspective view of the first removable plunger.
Figure 3C:
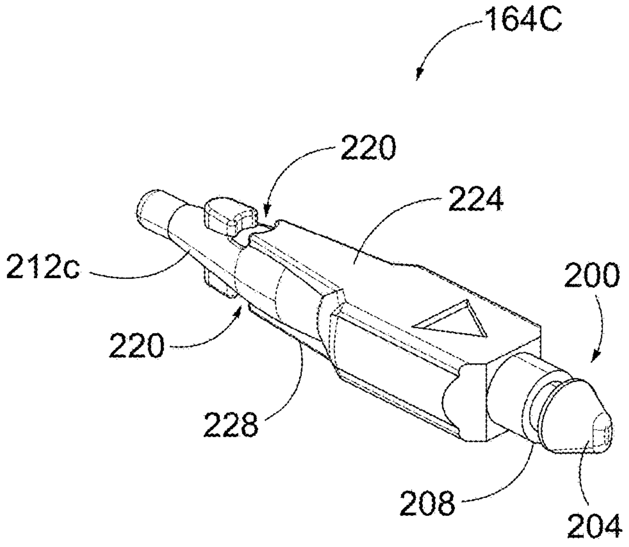
FIG. 3C is a first perspective view of a third removable plunger.
Figure 4A:
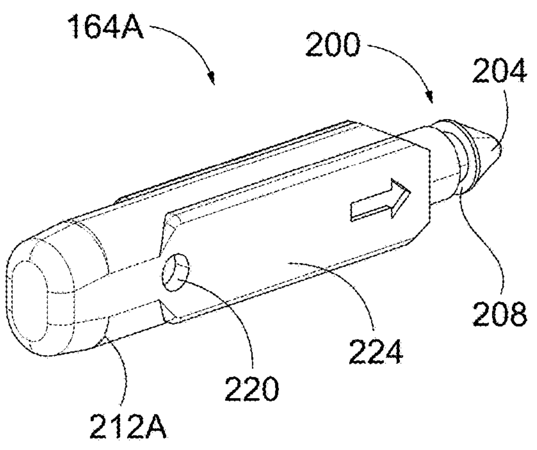
FIG. 4A is a second perspective view of the second removable plunger.
Figure 4B:
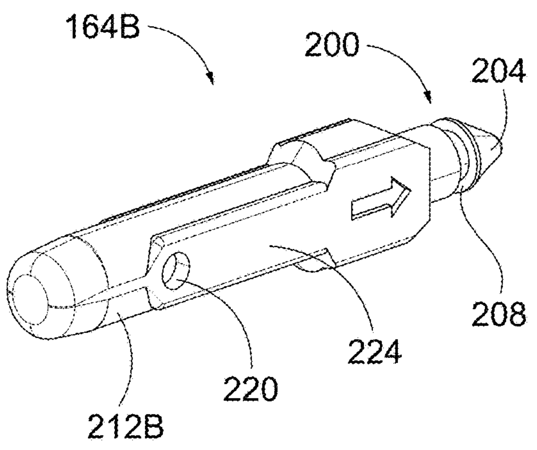
FIG. 4B is a second perspective view of the first removable plunger.
Figure 4C:
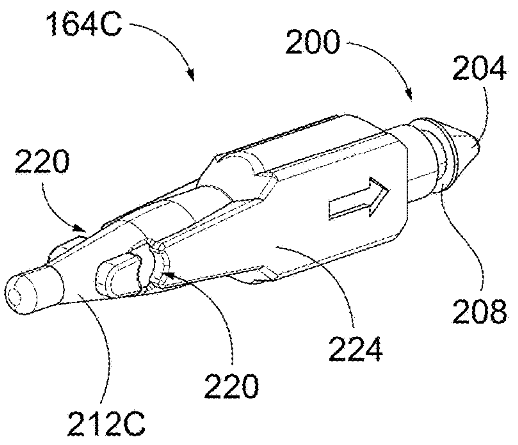
FIG. 4C is a second perspective view of the third removable plunger.

FIGS. 3A-3C illustrate the three different plungers 164A, 164B, 164C. A similar engagement feature 200 is provided at a first end of each plunger 164A, 164B, 164C. The engagement feature 200 includes a tapered tip 204 that increases in width from the distal end, terminating at a detent 208. The detent 208 is an annular recess having substantially radial sidewalls to engage the plunger engaging portion 172 of the engagement member 148. More specifically, the detent 208 engages a spring clip 140 (FIGS. 5-6) of the plunger engaging portion 172. In other embodiments, the detent 208 includes a spring clip (or other compressible material) that engages the engagement member 148. The substantially radial sidewalls inhibit accidental removal of the plunger 164A, 164B, 164C from the engagement member 148.

Each plunger 164A, 164B, 164C extends axially from the engagement feature 200 to a paddle 212A, 212B, 212C. The paddle 212A, 212B, 212C is the portion of the plunger 164A, 164B, 164C that contacts and separates the fingers 156, 160. As shown in FIG. 3A, the first plunger 164A has a paddle 212A having a first width. As shown in FIG. 3B, the second plunger 164B has a paddle having a second width, less than the first width. As shown in FIG. 3C, the third plunger 164C has paddle having a third width, less than the second width. The first plunger 164A therefore separates the fingers 156, 160 by (at least) the first width to engage a first slot of a portable electronic device, the second plunger 164B separates the fingers 156, 160 by (at least) the second width to engage a second (narrower) slot of a portable electronic device, and the third plunger 164C separates the fingers 156, 160 by (at least) the third width to engage a second (even narrower) slot of a portable electronic device.

Figure 13:
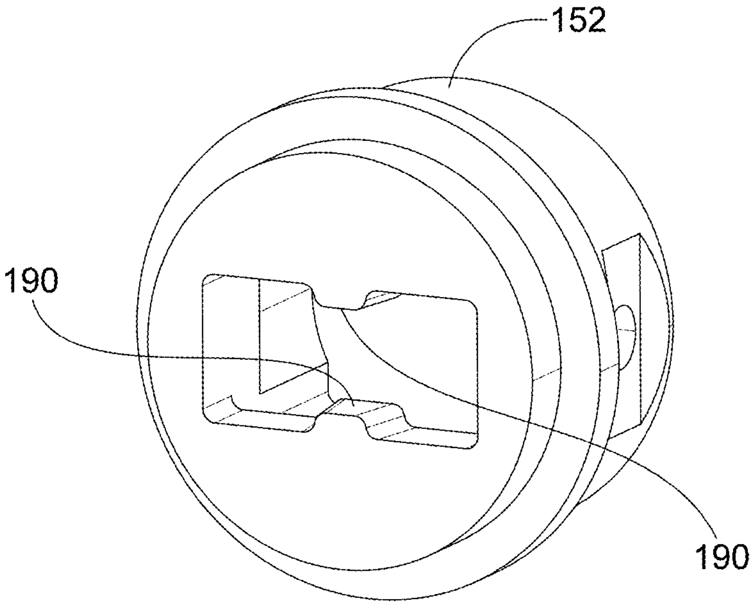
FIG. 13 is a second perspective view of the rotatable lock tip housing of the security apparatus of FIG. 1.

In some embodiments, the paddles 212A, 212B, 212C have rotational symmetry such that the plunger 164A, 164B, 164C is configured to be installed in any orientation. In other embodiments, such as is shown, the width of the paddle 212A, 212B, 212C is specific to a defined orientation. As shown in FIG. 13, the body 152 of the lock tip 112 includes opposing sidewalls 190 that engage opposing substantially planar surfaces 224, 228 (e.g., top and bottom surfaces, side surfaces) of the paddle 212A, 212B, 21C to prevent an incorrect installation orientation of the plunger 164A, 164B, 164C and to prevent rotation of the plunger 164A, 164B, 164C relative to the lock tip 112 when installed.

Figure 7:
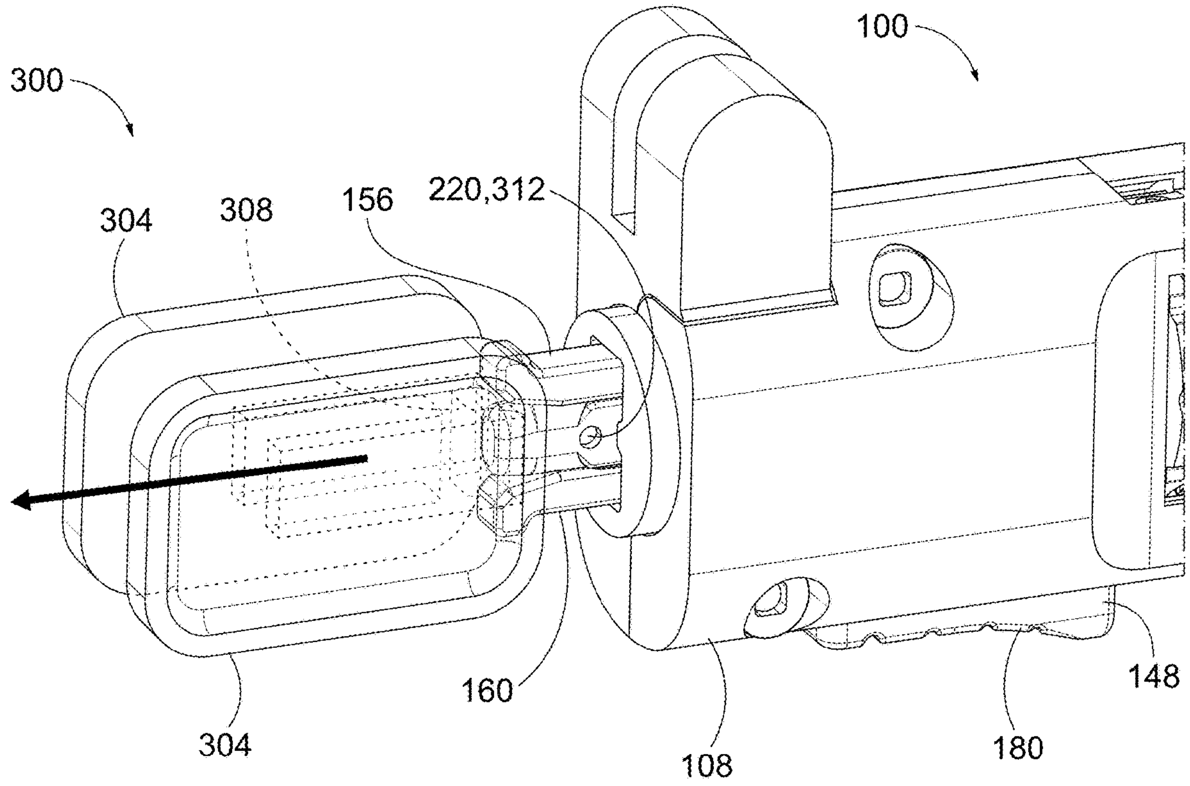
FIG. 7 is a perspective view of a plunger removal tool for removing the removable plungers from the security apparatus of FIG. 1.

Each plunger 164A, 164B, 164C further includes a pair of recesses 220 (e.g., openings, cutouts) on the opposing surface 224, 228 to be engaged by an extraction tool 300, as shown in FIG. 7. The extraction tool 300 includes a pair of substantially planar panel 304 oriented parallel to one another and connected to one another by a cross-brace 308. Each planar panel 304 includes a protrusion 312 (e.g., a cylindrical protrusion) extending inward towards the opposing panel 304. The protrusions 312 are configured to engage the recesses 220 on the installed plunger 164A, 164B, 164C. By applying an axial pulling force on the extraction tool 300, a user is capable of removing the installed plunger 164A, 164B, 164C by overcoming the force of the spring clip 140 within the detent 208.

In operation, to install a plunger 164A, 164B, 164C into the lock body, a user identifies the size and/or style of the slot of the portable electronic device and selects the appropriate one of the plungers 164A, 164B, 164C to securely engage the slot. The user axially inserts the selected plunger (for example, first plunger 164A) between the first and second fingers 156, 160. The opposing sidewalls 224, 228 of the plunger 164A slide along the sidewalls 190 of the lock tip 112 and into engagement with the plunger engaging portion 172 of the engagement member 148, the tapered tip 204 axially translating into the recess 172A until the spring clip 140 engages the detent 208. The plunger 164A is thereby installed and retained within the lock body 108.

To then remove the plunger 164A (i.e., to replace it with a different plunger, such as the second or third plunger 164B, 164C), the user grasps the extraction tool 300, sliding the planar panels between the fingers 156, 160 until the protrusions 312 of the extraction tool fall into the recesses 220 of the plunger 164A. The user provides a pulling force (and in some embodiments, a squeezing compressive force to push the two planar panels 304 and protrusions 312 towards one another) to the extraction tool 300 to overcome the force between the detent 208 and the spring clip 140. Once the spring clip 140 is removed from the detent 208, the plunger is axially removed between the fingers 156, 160.

Having selected the appropriate plunger 164A, 164B, 164C, to lock the portable electronic device with the security apparatus 100, a user fastens the cable 144 around a relatively stationary object with the security apparatus 100 in the unlocked position. The user inserts the fingers 156, 160 into the slot of the portable electronic device and slides the engagement member 148 to the engaged position such that the chosen plunger 164A, 164B, 164C pushes the fingers 156, 160 outward into engagement with the slot. The user actuates the locking mechanism by rotating the dials 136 of the combination lock mechanism 128 or by rotating the key 232 within the key opening of the keyed lock mechanism 128'.

To unlock the portable electronic device from the security apparatus 100, the user rotates the dials 136 to the appropriate values or rotates the key 136 within the lock cylinder 128 from the first, locked position to the second, unlocked position, thereby allowing for axial movement of the engagement member 148 relative to the lock body 108. The user translates the engagement member 148 away from the fingers, retracting the selected plunger 164A, 164B, 164C, and retracting the fingers 156, 160 radially inward, thereby unlocking the lock tip 112 from the portable electronic device.

Various features and advantages of the invention are set forth in the following claims.

What is claimed is:

1. A security apparatus for a portable electronic device, the security apparatus comprising:

a lock body;

an engagement member supported by the lock body; and a lock tip configured to selectively engage the portable electronic device, the lock tip movable by the engagement member between an engaged position, in which the lock tip is secured to the portable electronic device, and a disengaged position, in which the lock tip is unsecured from the portable electronic device, the lock tip including a first finger and a second finger that engage the portable electronic device in the engaged position, and a plunger that extends between the first and second fingers and is movable by the engagement member, wherein the plunger includes an engagement feature configured to removably engage the engagement member such that the plunger is selectively removable by a user, and wherein the plunger is removable from the lock body without disassembly of the lock body.

2. The security apparatus of claim 1, wherein the engagement member includes a user engaging portion configured to be engaged by a user to move the engagement member relative to the lock body.

3. The security apparatus of claim 2, wherein the user engaging portion is coupled to a plunger engaging portion of the engagement member, wherein the plunger engaging portion of the engagement member includes an engagement feature configured to removably engage the plunger.

4. The security apparatus of claim 1, wherein the plunger is linearly slidable between the engaged position and the disengaged position.

5. The security apparatus of claim 1, wherein the plunger is removable from the lock body without removal of the remainder of the lock tip from the lock body.

6. The security apparatus of claim 1, wherein the lock body includes a lock mechanism formed as a combination lock mechanism or a keyed lock mechanism.

7. The security apparatus of claim 1, wherein the plunger is a first plunger and is replaceable by a second plunger having a decreased width relative to the first plunger such that the first and second fingers are spaced apart from one another by a first distance when the first plunger is in the engaged position and by a second distance, less than the first distance, when the second plunger is in the engaged position.

8. A security apparatus configured to interchangeably engage a slot of a first portable electronic device and a slot of a second portable electronic device, the security apparatus comprising:

a lock body;

an engagement member supported by the lock body; and a lock tip configured to selectively engage the portable electronic device, the lock tip movable by the engagement member between an engaged position, in which the lock tip is secured to the portable electronic device, and a disengaged position, in which the lock tip is unsecured from the portable electronic device, the lock tip including a first finger and a second finger that engage the portable electronic device in the engaged position and an interchangeable first plunger and second plunger, wherein the first plunger is configured to create a gap of a first width when installed between the first and second fingers and in the engaged position, and wherein the second plunger creates a gap of a second width when installed between the first and second fingers and in the engaged position, wherein the second width is less than the first width.

9. The security apparatus of claim 8, wherein the engagement member includes a user engaging portion configured to be engaged by a user to move the engagement member relative to the lock body.

10. The security apparatus of claim 9, wherein the user engaging portion is coupled to a plunger engaging portion of the engagement member, wherein the plunger engaging portion of the engagement member includes an engagement feature configured to separately engage the first plunger and the second plunger.

11. The security apparatus of claim 8, wherein the first plunger is linearly slidable between the engaged position and the disengaged position.

12. The security apparatus of claim 11, wherein the second plunger is linearly slidable between the engaged position and the disengaged position.

13. The security apparatus of claim 8, wherein each plunger of the first plunger and the second plunger is removable from the lock body without disassembly of the lock body.

14. The security apparatus of claim 8, wherein each plunger of the first plunger and the second plunger is removable from the lock body without removal of the remainder of the lock tip from the lock body.

15. The security apparatus of claim 8, wherein the lock body includes a lock mechanism formed as a combination lock mechanism or a keyed lock mechanism.

16. A method of modifying a security apparatus comprising:

axially removing a first plunger from between a first finger and a second finger of the security apparatus; and axially inserting a second plunger dissimilar from the first plunger between the first and second fingers.

17. The method of claim 16, wherein axially removing the first plunger includes disengaging an engagement feature of the first plunger from an engagement member.

18. The method of claim 17, wherein axially inserting the second plunger between the first and second plungers includes engaging an engagement feature of the second plunger with the engagement member.

19. The method of claim 16, wherein axially removing the first plunger includes engaging opposing sides of the first plunger with a tool.

20. A security apparatus for a portable electronic device, the security apparatus comprising:

a lock body;

an engagement member supported by the lock body; and a lock tip configured to selectively engage the portable electronic device, the lock tip movable by the engagement member between an engaged position, in which the lock tip is secured to the portable electronic device, and a disengaged position, in which the lock tip is unsecured from the portable electronic device, the lock tip including a first finger and a second finger that engage the portable electronic device in the engaged position, and a plunger that extends between the first and second fingers and is movable by the engagement member, wherein the plunger includes an engagement feature configured to removably engage the engagement member such that the plunger is selectively removable by a user, and wherein the plunger is removable from the lock body without removal of the remainder of the lock tip from the lock body.

* * * * *